United States Patent [19]

Chito et al.

[11] Patent Number: 4,695,778
[45] Date of Patent: Sep. 22, 1987

[54] ROTATION PHASE CONTROL DEVICE

[75] Inventors: Yasuo Chito, Saitama; Masahiko Ogawa, Tokyo, both of Japan

[73] Assignee: Canon Kabushiki Kaisha, Tokyo, Japan

[21] Appl. No.: 693,501

[22] Filed: Jan. 22, 1985

[30] Foreign Application Priority Data

Jan. 26, 1984 [JP] Japan ................................. 59-13156

[51] Int. Cl.⁴ ............................................. H02P 5/50
[52] U.S. Cl. ..................................... 318/314; 318/85; 318/618; 318/619; 318/341
[58] Field of Search ............... 318/314, 317, 318, 321, 318/326, 327, 328, 329, 308, 341, 342, 345 A, 345 AB, 345 CA, 599, 604, 606, 607, 608, 609, 615, 616, 617, 618, 619, 85

[56] References Cited

U.S. PATENT DOCUMENTS

| 3,599,063 | 8/1971 | Sadaaki Nanai | 318/327 |
|---|---|---|---|
| 3,636,364 | 1/1972 | Stempler et al. | 318/85 X |
| 3,671,835 | 6/1972 | McMenamy et al. | 318/308 |
| 3,673,422 | 6/1972 | Parke | 318/85 X |
| 3,777,233 | 12/1973 | Natens | 318/327 X |
| 3,934,182 | 1/1976 | Donohue et al. | 318/85 |
| 3,934,269 | 1/1976 | Fujita et al. | 318/314 X |
| 3,944,896 | 3/1976 | Rodek | 318/619 X |
| 3,947,737 | 3/1976 | Kimura et al. | 318/314 X |
| 4,029,946 | 6/1977 | Gerstine et al. | 318/609 X |
| 4,099,111 | 7/1978 | Inaba et al. | 318/338 |
| 4,099,112 | 7/1978 | Klinger | 318/617 X |
| 4,271,382 | 6/1981 | Maeda et al. | 318/314 X |
| 4,319,173 | 3/1982 | Rhodes | 318/609 |
| 4,355,266 | 10/1982 | Pearson | 318/314 X |
| 4,386,300 | 5/1983 | Ogawa | 318/314 |
| 4,441,061 | 4/1984 | Yosida et al. | 318/601 X |
| 4,476,417 | 10/1984 | Zimmermann | 318/317 X |
| 4,500,822 | 2/1985 | Tajima et al. | 318/318 X |
| 4,506,202 | 3/1985 | Tajima et al. | 318/603 |
| 4,564,795 | 1/1986 | Parkes et al. | 318/314 |

Primary Examiner—William M. Shoop, Jr.
Assistant Examiner—Shik Luen Paul Ip
Attorney, Agent, or Firm—Toren, McGeady & Associates

[57] ABSTRACT

A rotation phase control device which synchronizes the rotation phase of the rotor of a motor with a reference signal and which has a steady-state characteristic compensating circuit improves the starting characteristic of the motor by compensating characteristic control apparatus for varying the compensating characteristic of the compensating circuit based on whether or not the rotation phase of the rotor is within a predetermined synchronization range relative to the reference signal.

5 Claims, 7 Drawing Figures 4,695,778

ROTATION PHASE CONTROL DEVICE

BACKGROUND OF THE INVENTION

1. Field of the Invention

This invention relates to a rotation phase control device for synchronizing the rotation phase of the rotor of a motor with a reference signal and more particularly to a rotation phase control device provided with a steady-state characteristic compensating circuit.

2. Description of the Prior Art

For a motor to rotate at a constant speed and a constant phase, the speed and phase of rotation of the motor are generally unvarying and are controlled by means of a speed control loop and a phase control loop with these control loops arranged for the motor. In this instance, to compensate for the steady-state characteristic of the phase control loop, previously either a lug-lead type loop filter which consists of resistors R1 and R2 and a capacitor C as shown in FIG. 1A of the accompanying drawings was inserted into the input stage of an error amplifier A or a lug type loop filter which consists of a resistor R2 and a capacitor C as shown in FIG. 1B was inserted into the feedback loop of an error amplifier A. The phase error at a steady-state can be reduced by the addition of the loop filter as shown in FIG. 1A or FIG. 1B, because it is possible to increase a gain within a low zone to a degree without impairing a phase allowance in a high zone.

However, the phase control loop with the above-described construction has a time constant (CR) and therefore deteriorates the starting characteristic of the motor.

The steady-state characteristic of a motor is generally inversely proportional to the starting characteristic thereof. Therefore, the starting characteristic is deteriorated as the steady-state characteristic is improved.

It is therefore a principal object of this invention to provide a novel rotation phase control device which is capable of eliminating the above-stated shortcoming of the prior art device and to provide a servo control device employing the rotation phase control device.

It is another object of the invention to provide a novel rotation phase control device which is capable of improving the starting characteristic of a motor by very simple means without deteriorating the steady-state characteristic of the motor and to provide a servo control device employing the rotation phase control device.

These and further objects and features of the invention will become apparent from the following detailed description of a preferred embodiment thereof taken in conjunction with the accompanying drawings.

SUMMARY OF THE INVENTION

To attain these objects, a rotation phase control device which embodies an aspect of this invention and which synchronizes the rotation phase of the rotor of a motor with a reference signal comprises: Rotation phase control means; compensating means for compensating the steady-state characteristic of the phase control means; and compensating characteristic control means which varies the compensating characteristic of the compensating means based on whether or not the rotation phase of the rotor is within a predetermined synchronization range relative to the reference signal.

BRIEF DESCRIPTION OF THE DRAWINGS

A preferred embodiment of the invention is arranged as shown in the accompanying drawings in which:

FIG. 1A shows the circuit of a lug lead type loop filter and FIG. 1B shows the circuit of a lug type loop filter.

DETAILED DESCRIPTION OF THE PREFERRED EMBODIMENT

In the following description which shows a preferred embodiment of this invention, the invention is applied to a rotation phase control circuit for a motor which drives and rotates a rotating record bearing medium such as a magnetic disc, a magnetic drum or the like. However, the invention is also applicable to motors used for other purposes.

Figure 2:
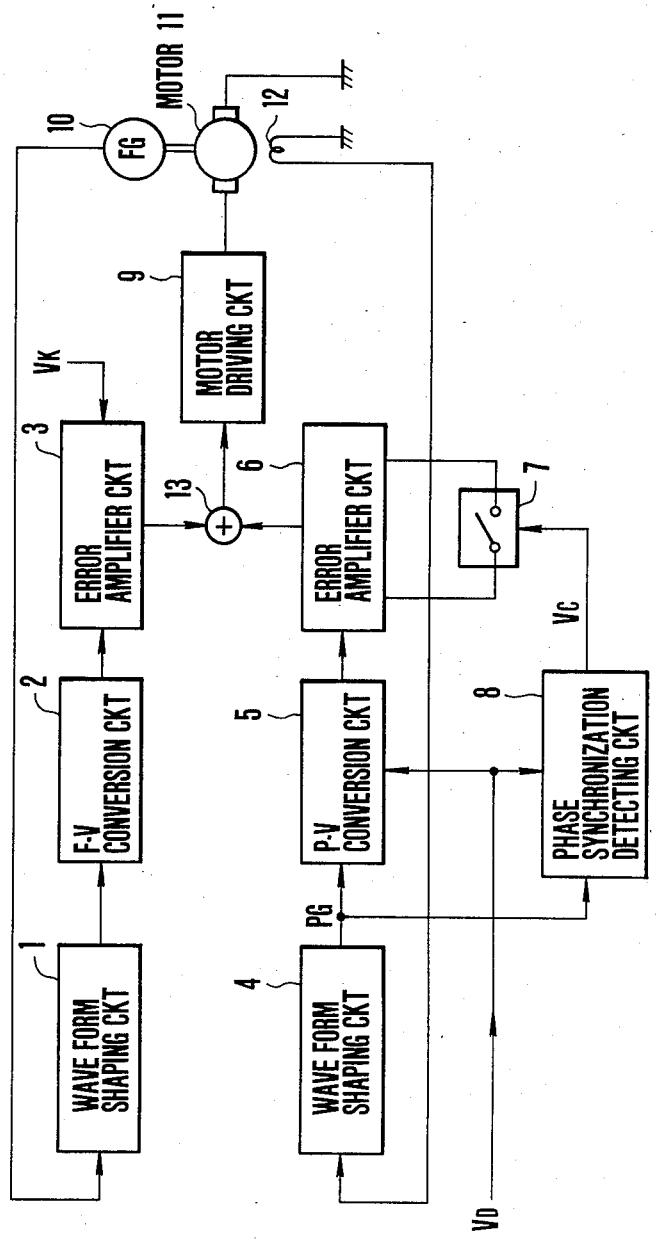
FIG. 2 is a block diagram showing a motor servo circuit provided with a phase control device according to the present invention in an embodiment thereof.

FIG. 2 shows, by way of example, a motor servo circuit including the embodiment of this invention in which the speed and phase or rotation of a motor are controlled with the motor driving and rotating a rotating record bearing medium such as magnetic disc, a magnetic drum or the like. A speed control loop is formed by a frequency generator 10, a wave form shaping circuit 1, a frequency-to-voltage (F-V) conversion circuit 2, an error amplifier circuit 3, an adder 13 and a motor driving circuit 9. A phase control loop is formed by a rotation phase detector 12, a wave form shaping circuit 4, a phase-to-voltage (P-V) conversion circuit 5, a phase synchronization detecting circuit 8, an error amplifier circuit 6 which is provided with an electronic switch 7, an adder 13 and a motor driving circuit 9. Details of these circuit elements will be described later herein.

A motor 11 drives a rotating record bearing medium (not shown). In this specific embodiment, a rotating shaft 14 of the motor 11 is connected to the frequency generator 10 which generates a signal FG of a frequency corresponding to the rotation speed of the motor 11. The signal FG thus produced is supplied to the wave form shaping circuit 1. At the wave form shaping circuit 1, the signal from the frequency generator 10 is subjected to a wave form shaping process. The wave form shaped signal thus obtained is supplied to the frequency-to-voltage (F-V) conversion circuit 2. The circuit 2 converts the input signal into a voltage signal of an amplitude corresponding to the frequency of the input signal. The voltage signal is supplied to the error amplifier circuit 3 of the next stage. At the error amplifier circuit 3, the input voltage signal is compared with a reference voltage Vk. A difference voltage thus obtained is amplified and supplied to the adder 13.

In detecting the rotation phase of the motor 11, the rotation phase detector 12 detects the rotation phase of a rotation phase indicating member such as a magnet which is either attached to the rotor of the motor 11 or attached to the record bearing medium. The phase detector 12 generates a pulse signal representing the rotation phase of the motor 11. The pulse signal is supplied to the wave form shaping circuit 4 to shape the wave form there. An output PG thus obtained from the wave form shaping circuit 4 is supplied to the phase-to-voltage (P-V) conversion circuit 5 and also to the phase synchronization detecting circuit 8. The phase-to-voltage conversion circuit 5 and the phase synchronization detecting circuit 8 receive a predetermined synchronization reference signal VD respectively. At the phase-to-voltage conversion circuit 5, the output PG of the wave form shaping circuit 4, which is the pulse signal PG representing the rotation phase of the motor 11, is compared with the reference signal VD. The circuit 5 then generates a voltage signal corresponding to a phase difference between the pulse signal PG and the reference signal VD. The voltage signal is supplied to the error amplifier circuit 6. Upon receipt of the voltage signal, the error amplifier circuit 6 amplifies the input voltage signal. The amplified voltage signal is supplied to the adder 13. At the adder 13, the signal produced from the error amplifier circuit 3 of the speed control loop and the signal produced from the error amplifier circuit 6 of the phase control loop are added together. The sum signal thus obtained is supplied to the motor driving circuit 9. Then, the speed and phase of rotation of the motor 11 are controlled on the basis of this sum signal. The motor 11 is thus rotated at a predetermined speed and at a predetermined phase.

The phase synchronization detectimg circuit 8 is arranged as follows: The phase synchronization detecting circuit 8 receives the reference signal VD and the rotation phase pulse signal PG which represents the rotation phase of the motor 11 and is supplied from the wave form shaping circuit 4. A window signal of a predetermined width is formed on the basis of the rotation phase pulse signal PG. If the reference signal VD is out of range of synchronization with the window signal, the level of an output signal Vc of the phase synchronization detecting circuit 8 becomes, for example, high. Then, the electronic switch 7 which is included in the error amplifier circuit 6 and is, for example, composed of a transistor or the like turns on. If the reference signal VD is within the range of synchronization with the window signal on the other hand, the level of the output Vc of the circuit 8 becomes low to turn off the electronic switch 7 of the error amplifier circuit 6. Further details of the phase synchronization detecting circuit 8 will be described later herein.

Figure 3:
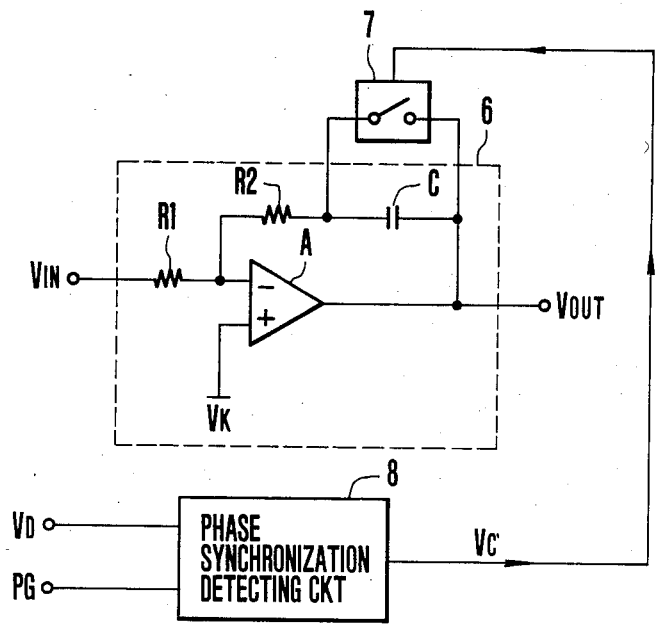
FIG. 3 is a circuit diagram showing the details of an error amplifier circuit included in FIG. 2.

FIG. 3 shows the details of the error amplifier circuit 6 of FIG. 2. The phase synchronization detecting circuit 8 receives the reference signal VD at one input terminal and the rotation phase pulse signal PG from the wave form shaping circuit 4 at the other input terminal thereof. As mentioned above, the output signal Vc of the phase synchronization detecting circuit 8 is at a high level when the reference signal VD is out of the range of phase synchronization with the window signal. In that case, the electronic switch 7 of the error amplifier circuit 6 is closed. Then, a capacitor C is electrically excluded from a steady-state characteristic compensating loop filter, which is disposed in the feedback loop of an error amplifier A of the circuit 6 and consists of a resistor R2 and the capacitor C. This quickens the speed buildup when the motor 11 is started. Conversely, if the reference signal VD is within the range of phase synchronization with the window signal, the output signal Vc of the phase synchronization detecting circuit 8 is at a low level. In that case, the low level output signal Vc opens the electronic switch 7 of the error amplifier circuit 6. With the switch 7 opened, the capacitor C is electrically inserted in the feedback loop of the error amplifier A. As a result, the gain of the low zone of frequency increases. The time constant of the error amplifier circuit 6 is thus varied by opening and closing the electronic switch 7, so that a compensating characteristic can be switched from one characteristic to another.

The error amplifier circuit 6 receives a phase error voltage signal at one input terminal thereof from the phase-to-voltage conversion circuit 5 and the reference voltage Vk at the other input terminal. The error amplifier circuit 6 compares these input signals and amplifies an error signal thus obtained. The amplified error signal is supplied to the adder 13 shown in FIG. 2.

Figure 4:
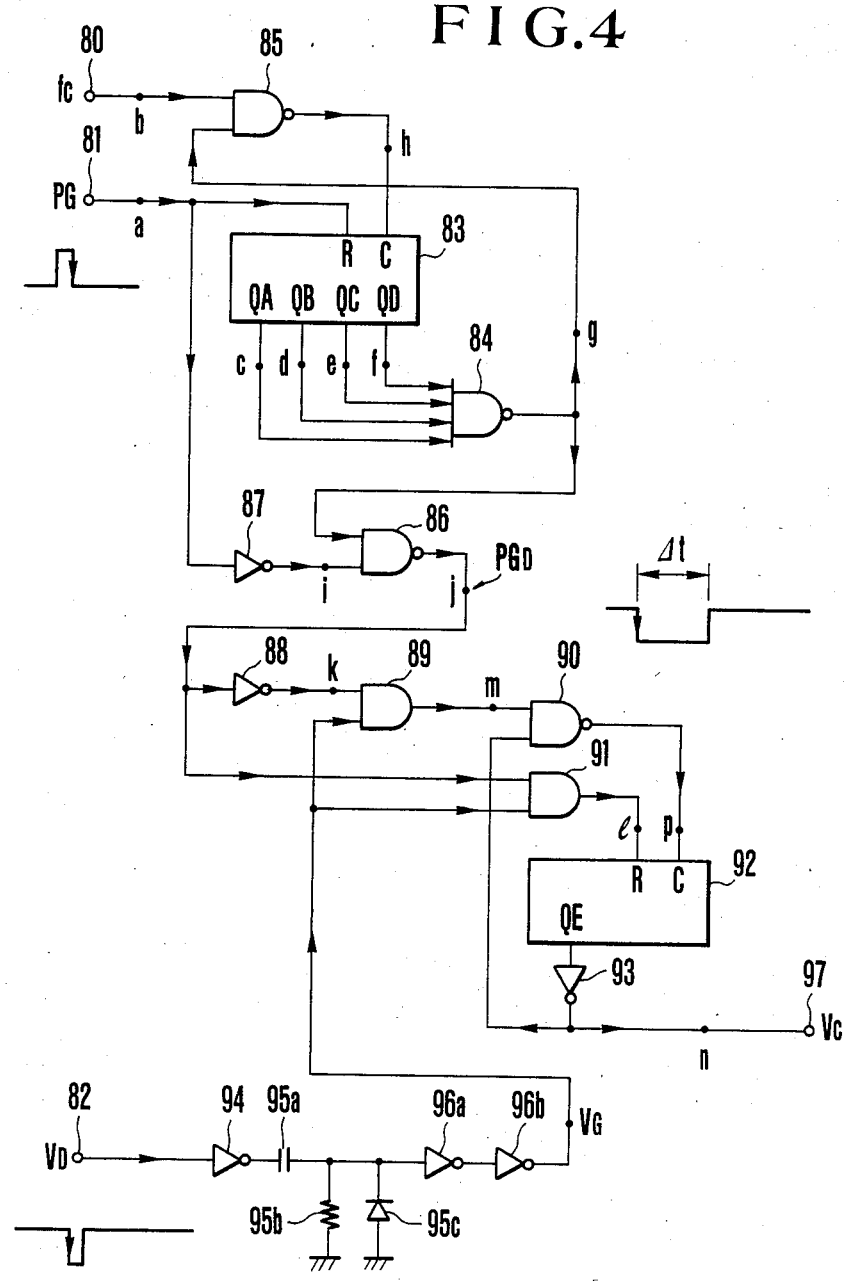
FIG. 4 is a circuit diagram showing the details of a phase synchronization detecting circuit included in FIG. 2.

The details of the phase synchronization detecting circuit 8 are as follows: Referring to FIG. 4, the circuit 8 is provided with an input terminal 80 for receiving clock pulses fc produced as shown at "b" in FIG. 5 from a clock signal generator (not shown); and another input terminal 81 for receiving the rotation phase pulse signal PG which represents the rotation phase of the motor 11 and has its wave form shaped as shown at "a" in FIG. 5 by the wave form shaping circuit 4 of FIG. 2. A fall-synchronizing type binary counter 83 is reset when the rotation phase pulse signal PG received at the input terminal 81 is supplied to a reset terminal R thereof. The binary counter 83 counts inverted clock pulses $\bar{f}c$ which are obtained by inverting the clock pulses fc supplied from the input terminal 80 (see "h" of FIG. 5). The counter 83 frequency divides the inverted clock pulses into $\frac{1}{2}$, $\frac{1}{4}$, $\frac{1}{8}$ and 1/16 values. The frequency divided pulses are then produced from output terminals QA, QB, QC and QD of the counter 83 as shown at "c", "d", "e" and "f" of FIG. 5. A NAND gate 84 is connected to the output stage of the binary counter 83 and performs a NAND process on the $\frac{1}{2}$, $\frac{1}{4}$, $\frac{1}{8}$ and 1/16 frequency divided inverted clock pulses $\bar{f}c$, which result from the clock pulses fc and are produced from the output terminals QA–QD of the binary counter 83. The NAND gate 84 then produces pulses as shown at "g" in FIG. 5. One of the pulses produced from the NAND gate 84 is supplied to one of the input terminals of a NAND gate 85, while the other pulse produced from the NAND gate 84 is supplied to one of the input terminals of another NAND gate 86. While the output pulse "g" of the NAND gate 84 is supplied to one of the input terminals of the NAND gate 85, the clock pulses fc are supplied to the other input terminal of the NAND gate 85. Therefore, the NAND gate 85 produces the inverted pulses $\bar{f}c$ of the clock pulses fc based on the NAND condition between the two input signals. The output of the NAND gate 85 is supplied to the count terminal C of the binary counter 83. An inverter 87 receives the rotation phase pulse signal PG, which is received at the input terminal 81. Then, an inverted phase pulse signal $\overline{PG}$ is produced from the inverter 87 and is supplied to the other input terminal of the NAND gate 86. The NAND gate 86 performs a NAND process on a inverted phase pulse signal $\overline{PG}$ received from the inverter 87 and the pulse output "g" of the NAND gate 84. The NAND gate 86 then produces a window signal PGD which has a predetermined time width Δt as shown at "j" in FIG. 5. This window signal PGD shifts on a time base based on the rotating speed of the motor 11. An inverter 88 inverts the window signal PGD produced from the NAND gate 86 and produces an inverted signal $\overline{PGD}$ as shown at "k" in FIG. 5. This signal $\overline{PGD}$ is applied to one of the input terminals of an AND gate 89. The window signal PGD is also supplied to one of the input terminals of an AND gate 91.

Figure 6:
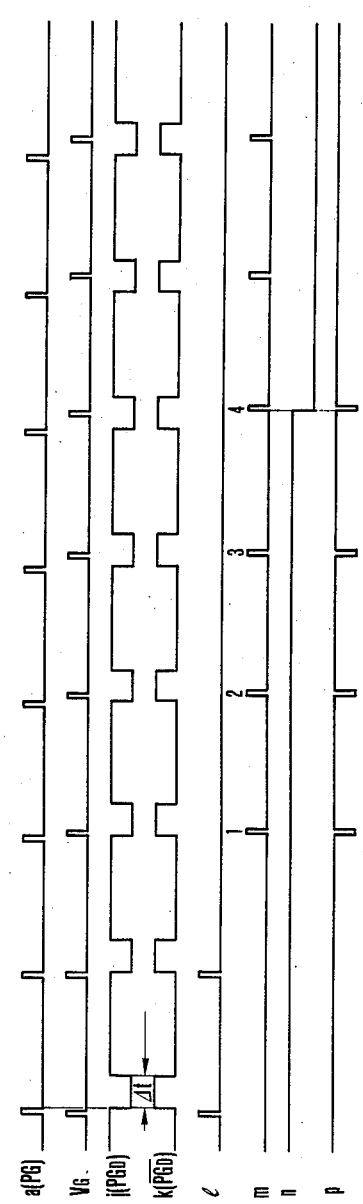
FIG. 6 is a timing chart showing the process of switch-over of the compensating characteristic of the error amplifier circuit included in a phase control loop.

The phase synchronization detecting circuit 8 is further provided with an input terminal 82 which receives the reference signal VD. The reference signal VD thus received is supplied to an inverter 94. A differentiation circuit is formed by a capacitor 95a and a resistor 95b. A diode 95c produces positive pulses. Reference numerals 96a and 96b identify inverters. The reference signal VD is inverted by the inverter 94. The inverted signal is differentiated by the differentiation circuit 95a and 95b and positive and negative pulses are produced. The diode 95c supplies only positive pulses to the inverter 96a. The inverter 96a inverts the positive pulses. Then, the inverted pulse signal thus obtained from the inverter 96a is further inverted by the inverter 96b and is shaped into reference pulses VG as shown at VG in FIG. 6. The reference pulse signal VG is supplied to the other input terminal of the AND gate 89 and also to the other input terminal of another AND gate 91. The AND gate 91 thus receives the reference pulse signal VG and the window signal PGD and produces pulses as shown at "l" in FIG. 6 when these inputs are synchronized. The output of the AND gate 91 is supplied to a reset terminal R of a fall synchronizing type binary counter 92 to clear the counting contents of the counter 92. On the other hand, the AND gate 89 receives the reference pulse signal VG and the inverted window signal $\overline{PGD}$ obtained by inverting the window signal PGD through the inverter 88 and produces a pulse signal as shown at "m" in FIG. 6 when these input signals are synchronized with each other. The pulse signal produced from the AND gate 89 is supplied to one of the input terminals of the NAND gate 90. The binary counter 92 produces a high level signal from its output terminal QE only when the number of pulses supplied to its count terminal C reaches a predetermined count value. With this exception, the binary counter 92 always produces a low level signal. An inverter 93, which is connected to the output terminal QE of the binary counter 92, produces a high level signal when the output of the output terminal QE is at a low level and produces a low level signal when the latter is at a high level. When a high level signal Vc which is as shown at "n" in FIG. 6 is supplied to the other input terminal of the NAND gate 90, the NAND gate 90 performs a NAND process on the high level signal Vc and the pulse output "m" of the AND gate 89. The NAND gate 90 then produces pulses as shown at "p" in FIG. 6. This pulse output "p" is supplied to the count terminal C of the binary counter 92. When a predetermined number, four in this instance, of the pulses from the NAND gate 90 have been counted, the binary counter 92 produces a high level signal from its output terminal QE. Then, the inverter 93 produces a low level signal as shown at "n" in FIG. 6. This signal, from the inverter 93 is supplied to the other terminal of the NAND gate 90 and also to a control terminal 97, which is connected to the electronic switch 7 shown in FIG. 2.

Figure 5:
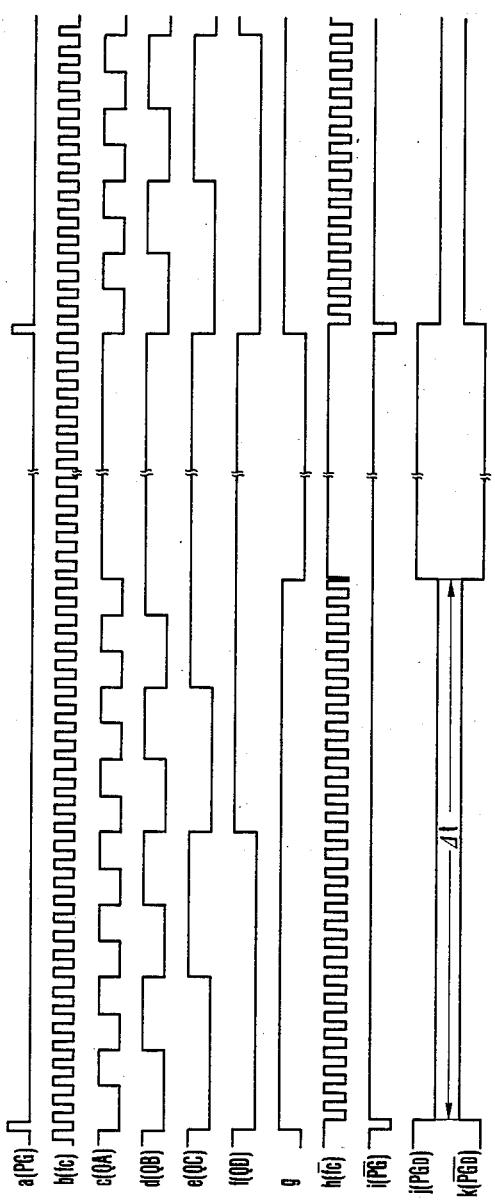
FIG. 5 is a timing chart showing a process of forming a window signal for setting a synchronization range.

Referring now to the timing chart of FIG. 5, the phase synchronization detecting circuit 8, which is arranged as described above, forms the window signal PGD in the following manner: The rotation phase pulse signal PG which represents the rotation phase of the motor 11 (see "a" in FIG. 5) and is supplied to the input terminal 81 is also supplied to the reset input terminal R of the binary counter 83 to clear the counting contents of the counter. The pulse signal PG is also supplied to the inverter 87. The inverted phase pulse signal $\overline{PG}$, which is then produced from the inverter 87 as shown at "i" in FIG. 5, is applied to the other input terminal of the NAND gate 86.

The clock pulses fc which are supplied to the input terminal 80 are applied to one of the input terminals of the NAND gate 85. Since the binary counter 83 is reset, no signal is produced from the output terminals QA, QB, QC and QD thereof. Therefore, the NAND gate 84 produces pulses as shown at "g" in FIG. 5. This output of the NAND gate 84 is supplied to the other input terminal of the NAND gate 85 on one hand and to one of the input terminals of the NAND gate 86 on the other hand. At the NAND gate 85, a NAND process is performed on the pulse output "g" of the NAND gate 84 and the clock pulses fc. The NAND gate 85 then produces the inverted clock pulses $\overline{fc}$ as shown at "h"0 in FIG. 5.

The inverted clock pulses are then supplied to the count terminal C of the binary counter 83. At the binary counter 83, the output terminal QA produces a pulse signal "c" of FIG. 5 which is obtained with the inverted clock pulses $\overline{fc}$ frequency divided into ½; the output terminal QB produces a pulse signal "d" of FIG. 5 which is obtained by frequency dividing the inverted clock pulses $\overline{fc}$ into ¼; the output terminal QC. produces a pulse signal "e" of FIG. 5 which is obtained by frequency dividing the inverted clock pulses into ⅛; and the output terminal QD produces a pulse signal "f" of FIG. 5 which is obtained by frequency dividing the inverted clock pulses into 1/16. These signals are supplied to the NAND gate 84. When the levels of all these signals "c", "d", "e" and "f" become high, the NAND gate 84 produces a low level signal (see "g" in FIG. 5). The low level signal from the NAND gate 84 is applied to the other input terminals of the NAND gates 85 and 86. At the NAND gate 85, a NAND process is performed on the pulse signal "g" produced from the NAND gate 84 and the clock pulses fc. The NAND gate 85 thus produces a high level signal as shown at "h" in FIG. 5 and supplies it to the count terminal C of the binary counter 83. This prevents the counting pulses from being supplied to the counter 83. Therefore, the binary counter 83 holds the counting content there. The NAND gate 86 performs a NAND process on the inverted phase pulse signal $\overline{PG}$ ("i" of FIG. 5) produced by the inverter 87 and the pulse output "g" of the NAND gate 84. The NAND gate 86 then produces the window signal PGD which has a predetermined time width 66 t, as shown at "j" in FIG. 5. The window signal PGD, which is thus formed for setting a synchronization range, is supplied to one of the input terminals of the AND gate 91 and to the inverter 88.

The operation processes described above are repeated to give the window signal PGD every time the rotation phase pulse signal PG is received and the binary counter 83 is reset.

When it is confirmed that the reference signal VD is stable and is within the range of synchronization with the window signal PGD which is formed from the rotation phase pulse signal PG, the time constant of the loop filter of the error amplifier circuit 6 of FIG. 3 is switched from one time constant value to another. The process of this switch-over will be described below with reference to the timing chart of FIG. 6:

The reference signal VD, which consists of negative synchronizing pulses supplied to the input terminal 82, is inverted by the inverter 94. Then, the differentiation circuit which consists of the capacitor 95a and the resistor 95b forms positive and negative pulses. The positive pulses are taken out by means of the diode 95c and are then inverted by the inverter 96a. The negative pulses are applied to the inverter 96b. The reference pulse signal VG, which is thus obtained as shown in FIG. 6, is supplied to the other input terminal of the AND gate 89 and also to that of the AND gate 91.

The AND gate 91 thus receives the reference pulse signal VG and the window signal PGD, which is as shown at "j" in FIG. 6. The AND gate 91 performs an AND process on the two signals VG, PGD to produce a pulse signal as shown at "l" in FIG. 6. This pulse signal "l" is supplied to the reset terminal R of the binary counter 92 to clear the counting contents of the binary counter 92. Then, the output level of the output terminal QE of the binary counter 92 becomes low. The inverter 93 then produces a high level signal Vc as shown at "n" in FIG. 6. This high level signal Vc is applied to the other input terminal of the NAND gate 90 and also to the control terminal 97 of the electronic switch 7 which is shown in FIG. 3 and is provided for changing the characteristic of the loop filter of the error amplifier circuit 6. Since the high level signal Vc is thus applied to the terminal 97, the switch 7 turns on or closes to electrically exclude the capacitor C from the loop filter, which consists of the resistor R2 and the capacitor C. This quickens the build up time at the start of rotation of the motor 11.

The AND gate 89 receives the reference pulse signal VG and the inverted window signal $\overline{PGD}$ which, is obtained from the inverter 88 as shown at "k" in FIG. 6. When the two input signals synchronize with each other in generation time, the AND gate 89 produces a pulse output as shown at "m" in FIG. 6. The pulse signal thus produced from the AND gate 89 is applied to one of the input terminals of the NAND gate 90. At the NAND gate 90, the signal Vc, which is produced from the inverter 93 as shown at "n" in FIG. 6, is received as well as the pulse signal produced from the AND gate 89. Then, a pulse signal shown at "n" of FIG. 6 is supplied to the count input terminal C of the binary counter 92. When four pulses of the pulse signal produced from the AND gate 89 as shown at "m" of FIG. 6 are counted by the binary counter 92, the output terminal QE of the counter 92 produces a high level signal. The level of the signal Vc from the inverter 93 then becomes low. The low level signal Vc turns off the electronic switch 7 to connect to the resistor R2 the capacitor C, which has been short-circuited till then. Furthermore, since the NAND gate 90 performs a NAND process on the low level signal Vc and the pulse output of the AND gate 89 shown at "m" of FIG. 6, the output signal "p" of the NAND gate 90 remains at a high level and the counting pulses to the counter 92, is cut off. The count content of the counter 92 which represents four pulses, remains unchanged. Accordingly, the high level signal output of the output terminal QE of the counter 92 remains unchanged and the low level signal Vc produced from the inverter 93 also remains unchanged. The electronic switch 7 is thus kept off or in an opened state.

In the event that the reference signal VD deviates the synchronization range set by the window signal PGD due to a change in the load on the motor 11 or the like, the AND gate 91 performs an AND process on the inverted window signal PGD and the reference pulse signal VG to produce pulses as shown at "l" in FIG. 6. This pulse output of the AND gate 91 is supplied to the reset terminal R of the binary counter 92 to reset the same. Thus reset, the counter 92 repeats the counting operation on the pulses supplied to its count terminal C in the same manner as described in the foregoing. Furthermore, with the pulses which are shown at "p" in FIG. 6 counted by the binary counter 92, if the reference signal VD deviates from the synchronization range set by the window signal PGD before four pulses are counted which is the predetermined number, the binary counter 92 is also reset and again begins to count in the same manner as mentioned above.

Therefore, with the predetermined count value preset at a suitable value at the binary counter 92, the switchover of the characteristic of the loop filter of the error amplifier circuit 6 can be accomplished when the rotating speed of the motor 11 has become sufficiently stable. Therefore, phase control can be accurately carried out over the motor 11.

Figure 1A:
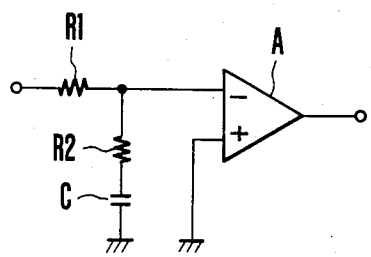
FIGS. 1A and 1B show two filters which compensate the steady-state characteristic of phase control loops according to the prior art.
Figure 1B:
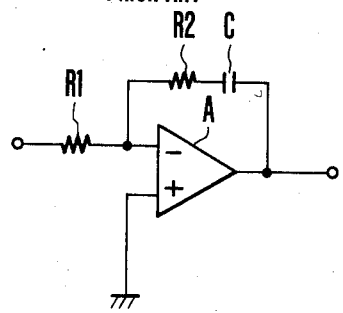

Furthermore, the compensation circuit arranged for the error amplifier circuit 6 in the embodiment described may be replaced with a filter at the input stage of the error amplifier A, as shown in FIG. 1A. In that case, the electronic switch 7 is arranged for the capacitor C which is shown in FIG. 1A. Furthermore, in accordance with this invention, the compensation circuit is not limited to a loop filter of the above-stated kind but may be selected from various kinds using circuit elements other than those mentioned in the foregoing. Furthermore, the characteristic of the compensation circuit may be shifted in a multi-stage manner with a plurality of the capacitors C employed. In this instance, a plurality of the electronic switches 7 may be arranged in combination with a plurality of phase synchronization detecting circuits 8 which operate these switches 7 with different synchronization ranges set for them, so that the compensating characteristic can be controlled stepwise by operating these electronic switches 7.

In the embodiment given, the predetermined synchronization range (or the window signal PGD) is set on the basis of the rotation phase pulse signal PG representing the rotation phase of the motor 11; and the reference signal VD (or the reference pulses VG) are examined to see if it is within the predetermined synchronization range. However, this arrangement may be conversely made. In other words, a predetermined synchronization range (or the window signal PGD) may be set on the basis of the reference signal VD and the rotation phase pulse signal PG may be examined if it is within the predetermined range.

In the foregoing description of the embodiment, the invention is applied by way of example, to the phase control loop of a motor servo circuit for a record bearing medium rotating motor employed in an apparatus which records or reproduces on or from a rotating record bearing medium such as a magnetic disc or a magnetic drum. Assuming that one field portion of a video signal is recorded or reproduced per turn of the record bearing medium in this instance, the rotational frequency of the motor is 3,600 rpm in the NTSC system. Further assuming that the rotation phase pulse signal has one pulse generated per turn of the record bearing medium or rotor of the motor 11, a signal of 60 Hz which corresponds to the vertical synchronizing signal included in a TV signal can be used as the reference signal VD in recording. Then, an accurate reference oscillator of 60 Hz is, of course, used for reproduction. Furthermore, in this instance, a clock signal having a frequency of about 200 KHz may be used as the clock signal fc. In cases where one frame portion of a video signal is recorded or reproduced per turn of the record bearing medium with the medium making one turn for one turn of the motor 11, the rotational frequency of the motor 11 is 1,800 rpm in the NTSC system. In this case, the above-stated signal of 60 Hz can be used as the reference signal VD by generating one pulse of the rotation phase pulse signal PG at every half turn of the motor 11. If the rotation phase pulse signal PG has one pulse generated per turn of the motor 11 instead of the half turn in this case, a signal of 30 Hz which is obtained by frequency dividing the above-stated signal of 60 Hz by 2 may be used as the reference signal VD. The same arrangement is also applicable for controlling a rotating head driving motor of a video type recorder.

Further, it is preferable, especially for an apparatus arranged to record a still picture or the like on a rotating record bearing medium, that recording can be accomplished soon after the start of a driving operation on the record bearing medium for quick shooting. In other words, it is desirable to have the rotation of the record bearing medium quickly stabilized in speed and phase after the start of a driving operation thereon. In this respect, the phase control circuit according to this invention is highly advantageous as the building up time of the motor can be shortened to a great degree. The invention is of course not limited to the embodiment given in the foregoing but is also applicable to various cases such as a rotating head driving motor of a VTR as mentioned above.

In accordance with the rotation phase control circuit of this invention, as described in the foregoing, the compensating characteristic of the steady-state characteristic compensating circuit is arranged to be variable according to whether or not the rotation phase of the rotor of a motor is within a predetermined range of synchronization with a reference signal. Therefore, the starting characteristic of the motor can be improved to greatly shorten the building up time of the motor without deteriorating the steady-state characteristic thereof.

What is claimed is:

1. A rotation phase control device for a motor having a rotor, comprising:
   (a) phase detection means for detecting the rotation phase of said rotor to produce a phase detection signal;
   (b) error detection means for producing a phase error signal which has a voltage corresponding to a phase difference between said phase detection signal and a predetermined reference signal;
   (c) discrimination means or periodically discriminating whether the phase difference between said phase detection signal and said reference signal is within a predetermined different to produce a discrimination signal;
   (d) amplifying means for amplifying said phase error signal;
   (e) rotation phase control means for controlling the rotation of said rotor based on said phase error signal amplified by said means; and
   (f) frequency characteristic changing means for changing the frequency characteristic of said amplifying means in response to said discrimination signal.

2. A device according to claim 1, wherein said enhancing means includes means for holding the discrimination signal of said discrimination means for each discrimination.

3. A device according to claim 1, wherein said discrimination means includes a circuit for forming a pulse of a predetermined width phase-synchronized to one of said phase detection signal and said reference signal and a pulse of narrow width phase-synchronized to the other signal, and a circuit for discriminating if said pulse of narrow width is present in the period of said pulse of predetermined width.

4. A device according to claim 1, wherein said charging means is arranged to increase the amplification of said amplifying means in the low frequency zone when the phase error between said phase detection signal and said reference signal is within a predetermined difference which is higher than that which occurs when the error is beyond the predetermined difference.

5. A servo control system for a motor having a rotor, comprising:
   (a) rotation speed control means for controlling the rotation speed of said rotor at a predetermined speed, said speed control means produces a speed error signal which varies in level according to the deviation of the actual rotation speed of the rotor from said predetermined speed;
   (b) phase detection means for detecting the rotation phase of the rotor to produce a phase detection signal;
   (c) rotation phase control means for controlling the rotation phase of said rotor synchronized with a predetermined reference signal, said phase control means includes production means for producing a phase error signal which varies in level according to the deviation in synchronization of said phase detection signal from said reference signal and amplifying means for amplifying said phase error signal;
   (d) discrimination means for periodically discriminating whether the phase error between said phase detection signal and said reference signal is within a predetermined difference to produce a discrimination signal;
   (e) summing means for summing up said speed error signal and said phase error signal amplified by said amplifying means to produce a summed up error signal;
   (f) drive means for driving said motor in response to said summed up error signal; and
   (g) frequency characteristic changing means for changing the frequency characteristic of said amplifying means in response to said discrimination signal.

* * * * *